(12) United States Patent
Takahashi

(10) Patent No.: US 7,711,752 B2
(45) Date of Patent: May 4, 2010

(54) INFORMATION PROCESSING APPARATUS, METHOD OF CONTROLLING INFORMATION PROCESSING APPARATUS, COMPUTER PROGRAM, AND STORAGE MEDIUM

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 11/448,809

(22) Filed: Jun. 8, 2006

(65) Prior Publication Data
US 2006/0282402 A1 Dec. 14, 2006

(30) Foreign Application Priority Data
Jun. 10, 2005 (JP) ............... 2005-171658

(51) Int. Cl.
  G06F 7/00 (2006.01)
  G06F 17/30 (2006.01)
(52) U.S. Cl. ...................... 707/792; 707/803
(58) Field of Classification Search ............ 707/102
  See application file for complete search history.

(56) References Cited

U.S. PATENT DOCUMENTS

| 6,599,324 | B2 | 7/2003 | Saito et al. ............. 715/513 |
| 6,606,633 | B1 * | 8/2003 | Tabuchi .................. 707/102 |
| 7,107,527 | B2 | 9/2006 | Takahashi et al. ........... 715/530 |
| 7,546,313 | B1 * | 6/2009 | Sonderegger ............ 707/104.1 |
| 2004/0205598 | A1 * | 10/2004 | Takahashi et al. ........... 715/513 |
| 2005/0027681 | A1 * | 2/2005 | Bernstein et al. .............. 707/1 |
| 2005/0171970 | A1 * | 8/2005 | Ozzie et al. ................. 707/102 |
| 2006/0101058 | A1 * | 5/2006 | Chidlovskii ................ 707/102 |

FOREIGN PATENT DOCUMENTS

| JP | 6-243018 | 9/1994 |
| JP | 7-56786 | 3/1995 |
| JP | 11-25076 | 1/1999 |
| JP | 2000-181917 | 6/2000 |
| JP | 2001-167086 | 6/2001 |

OTHER PUBLICATIONS

Hsiao et al. "Integrated XML Document Management", Springer Berlin/Heidelberg copyright 2003.*

* cited by examiner

Primary Examiner—Apu M Mofiz
Assistant Examiner—Cindy Nguyen
(74) Attorney, Agent, or Firm—Fitzpartick, Cella, Harper & Scinto

(57) ABSTRACT

An information processing apparatus includes an acquisition unit adapted to acquire management unit information indicating the management unit of access to a document file, a create/update unit adapted to create or update document management data including correspondence between the document file and the management unit based on the acquired management unit information, a hold unit adapted to hold the document management data, and a control unit adapted to control access to the document file based on the document management data held in the hold unit.

5 Claims, 11 Drawing Sheets

Document

| ID | Name | Type | Volume ID | Entity Path | Lock | Area | Rights |
|---|---|---|---|---|---|---|---|
| 1 | Chapter1 | Entity | 1 | //Chapter [1] | N | Creation Area | 1 |
| 2 | Chapter2 | Entity | 1 | //Chapter [2] | N | Creation Area | 2 |

Volume File

| ID | Path |
|---|---|
| 1 | C:¥app1¥vol |
| 2 | C:¥app1¥vol |

Rights

| ID | Group ID | File Name | Type | Rights |
|---|---|---|---|---|
| 1 | 1 | aa.xml | XML | Write |
| 2 | 2 | aa.xml | XML | Read |
| 2 | 1 | bcd.jpg | JPEG | Write |
| 3 | 1 | | | Write |
| 3 | 2 | | | Write |

Sub File

| ID | Volume ID | Doc ID |
|---|---|---|
| 1 | 2 | 2 |

Group ID

| ID | User Name |
|---|---|
| 1 | Team A |
| 2 | Team B |

802

Document

| ID | Name | Type | Volume ID | Entity Path | Lock | Area | Rights |
|---|---|---|---|---|---|---|---|
| 1 | Chapter1 | Entity | 1 | //Chapter [1] | N | Creation Area | 1 |
| 2 | Chapter2 | Entity | 1 | //Chapter [2] | N | Creation Area | 2 |
| 3 | Spec Document | Multi File | 1 | (NULL) | N | Open Area | 3 |

(Deleted) / (Added) annotations shown

Volume File

| ID | Path |
|---|---|
| 1 | C:¥app1¥vol |
| 2 | C:¥app1¥vol |

Rights

| ID | Group ID | File Name | Type | Rights |
|---|---|---|---|---|
| 1 | 1 | aa.xml | XML | Write |
| 2 | 2 | aa.xml | XML | Read |
| 2 | 1 | bcd.jpg | JPEG | Write |
| 3 | 1 | | | Write |
| 3 | 2 | | | Write |

Sub File (803)

| ID | Volume ID (804) | Doc ID (805) |
|---|---|---|
| 1 | 2 | 3 |

Group ID

| ID | User Name |
|---|---|
| 1 | Team A |
| 2 | Team B |

INFORMATION PROCESSING APPARATUS, METHOD OF CONTROLLING INFORMATION PROCESSING APPARATUS, COMPUTER PROGRAM, AND STORAGE MEDIUM

FIELD OF THE INVENTION

The present invention relates to a technique for managing document information.

BACKGROUND OF THE INVENTION

In recent years, along with the prevalence of markup languages such as XML (Extensible Markup Language) and the like, the configuration of document data has diversified. Conventional document data generally consists of one file. However, in recent years, document data is configured using various configurations:

(1) a configuration that configures one document using a plurality of files (XML, HTML (Hyper Text Markup Language), and the like), and (2) a configuration that configures a plurality of documents using one file (XML, archive file, and the like).

Conventionally, a document management system that manages one file as one document is known. When document data with configuration (1) is stored in such a document management system, a plurality of files are stored and managed as independent documents. On the other hand, when document data with configuration (2) is stored, one file including a plurality of documents is stored and managed intact as one document. Note that document management mainly includes access right control, attribute assignment, classification/arrangement, and the like, and the same applies to the following description unless otherwise specified.

A different document management system is also widely known. That is, in this system, when some processing instruction (e.g., move, copy, delete, or the like) is issued to a main body file (e.g., an HTML file or the like) of a document such as an HTML document to which an attached file (e.g., an image file or the like) is associated with the main body file, the same processing is automatically done for the attached file. Such document management system allows the user to easily manage the main body file and attached file as one document together.

Upon storing a structured document including a plurality of entities (minimum units of a document) like document data with configuration (2), a document management system which divides a file for respective entities, and manages the divided data as a document is also known (Japanese Patent Laid-Open No. 2001-167086).

In the aforementioned conventional document management systems, management is uniformly made using an identical management unit, i.e., one of a file or document as a unit for either of document data with configuration (1) in which one document is configured by a plurality of files, and document data with configuration (2) in which a plurality of documents are configured by one file.

The system that manages one file as one document is not suited to manage document data in which one document is configured by a plurality of files.

The document management system which allows to manage a main body file and attached file as one document together can handle a plurality of files as one document for a document with a specific format such as an HTML document which is defined in advance based on extensions and the like. However, such document management system cannot handle a plurality of files as one document for a document which is not compliant with the specific format.

In the document management system which divides a file into respective entities and manages divided data upon storing a structured document including a plurality of entities like the system disclosed in Japanese Patent Laid-Open No. 2001-167086, an attribute as a single file of the original structured document file cannot be utilized. For example, a system that derives a hash value from binary information of a file itself, and attaches a signature to that hash value so as to attain falsification detection is available. However, in this case, if a source file is divided and stored, binary characteristics of an actual file itself are destroyed, and when such divided files are stored in the document management system, falsification is undesirably detected, resulting in poor collaboration between the two systems.

The conventional document management system cannot easily manage an internal structure that combines structures (1) and (2). Such a drawback will be described below with reference to FIG. 5. FIG. 5 illustrates an example of a document having a combined structure.

Reference numeral 501 denotes a structured file group which includes Base.xml as a main file (main body file); and 502 and 503, data contents of Base.xml and Spec.xml.

Referring to FIG. 5, Spec.xml and Detail.xml are sub-files (attached files) of Base.xml. This fact is described by reference tags 506 and 507 to Spec.xml and Detail.xml in the data contents 502 of Base.xml. The reference relationship of these files is visualized since browse software automatically loads and merges Spec.xml and Detail.xml and displays them as one document upon browsing Base.xml using the browse software. This is the same scheme as that of Internet browse software (Web browser or the like) which automatically loads image files of an HTML document to configure and display images.

Concept.xml, Report.xml, and other jpeg files are also sub-files of the corresponding host files.

Upon managing such documents, a case will be examined below wherein the user wants to manage Base.xml as independent documents in correspondence with entities 508, 509, and 510 in <News> and </News>, and Spec.xml, i.e., four files including Concept.xml, Package.jpg, and Map.jpg as sub-files as one document.

However, when data with such configuration are fetched by a conventional document management system 504 described above, since one file is fetched as one document, files are registered as independent documents, as indicated by 505. In the conventional document management system, once files are stored in the system in units like 505, the document management units cannot be changed by merely changing the storage locations or status in the system.

Also, an arrangement which separately comprises a document creation area for temporarily storing a created document, and a document publish area for publishing and sharing a created document to be shared in a team of a plurality of users, has been proposed. In such an arrangement, security of each individual information must be enhanced in the process of creating a document, and there is a need for setting access rights for respective entities (e.g., chapters or clauses). However, after the document is published, if the respective entities are separately published, it is difficult manage them as an integral product. For this reason, after the document is "published", there is also a need for publishing these entities as one document together. However, the conventional document management system cannot satisfy the above needs since it cannot change a management unit in correspondence with changes in storage location or status of a document.

SUMMARY OF THE INVENTION

The present invention has been made in consideration of the aforementioned problems, and has as its object to provide a document management technique that can uniformly manage document data having various configurations.

In order to achieve the above object, an information processing apparatus according to the present invention comprises the following arrangement. That is, an information processing apparatus comprises:

an acquisition unit adapted to acquire management unit information indicating a management unit of access to a document file;

a create/update unit adapted to create or update document management data including correspondence between the document file and the management unit based on the acquired management unit information;

a hold unit adapted to hold the document management data; and a control unit adapted to control access to the document file based on the document management data held in the hold unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 shows an example of document management data;

DETAILED DESCRIPTION OF THE PREFERRED EMBODIMENTS

Preferred embodiments of the present invention will be described in detail hereinafter with reference to the accompanying drawings. Note that building components described in the embodiments are merely examples, and do not limit the scope of the present invention only to them.

First Embodiment

Hardware Arrangement of Information Processing Apparatus

Figure 9:
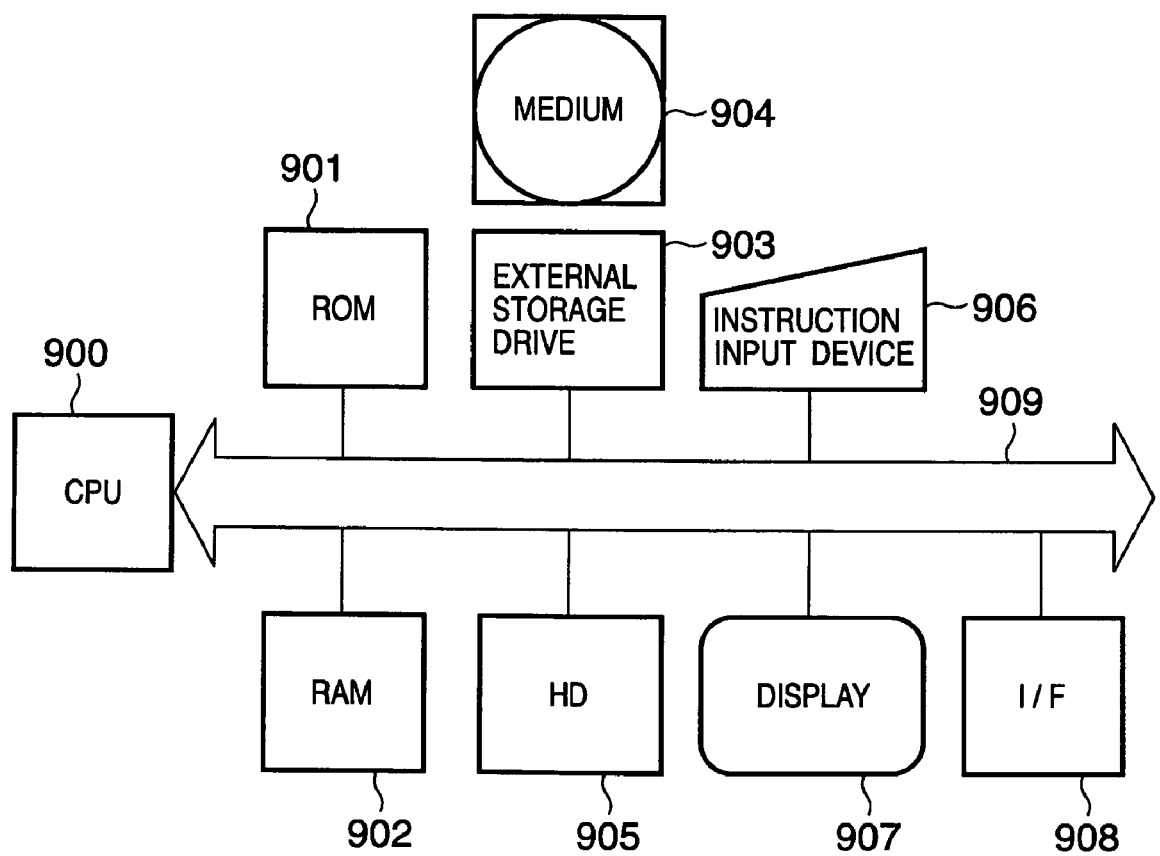
FIG. 9 is a block diagram showing the hardware arrangement of an information processing apparatus according to an embodiment of the present invention.

The hardware arrangement of an information processing apparatus according to this embodiment will be described below with reference to FIG. 9. FIG. 9 is a block diagram showing the hardware arrangement of an information processing apparatus according to this embodiment. Note that the information processing apparatus according to this embodiment is implemented by, e.g., a personal computer (PC), workstation (WS), personal digital assistant (PDA), or the like.

Referring to FIG. 9, reference numeral 900 denotes a CPU. The CPU 900 executes application programs, an operating system (OS), control programs, and the like stored in a hard disk device 905 (to be described later), and makes control for temporarily storing information, files, and the like required to execute programs in a RAM 902.

Reference numeral 901 denotes a ROM which stores programs such as a basic I/O program and the like, and various data such as font data, template data, and the like used in document processing. Reference numeral 902 denotes a RAM which temporarily stores various data, and serves as a main memory, work area, and the like of the CPU 900.

Reference numeral 903 denotes an external storage drive required to implement access to storage media, and can load programs and the like stored in a medium (storage medium) 904 to this computer system. Note that an arbitrary medium 904 such as a flexible disk (FD), CD-ROM, CD-R, CD-RW, PC card, DVD, IC memory card, MO, memory stick, and the like can be used.

Reference numeral 905 denotes an external storage device. In this embodiment, a hard disk device (HD) that serves as a large-capacity memory is used as the external storage device 905 in this embodiment. The HD 905 stores application programs, OS, control programs, related programs, and the like.

Reference numeral 906 denotes an instruction input device which corresponds to a keyboard, a pointing device (mouse or the like), a touch panel, and the like. The user inputs commands and the like for controlling the apparatus to the information processing apparatus according to this embodiment using the instruction input device 906.

Reference numeral 907 denotes a display which displays commands input from the instruction input device 906, response outputs of the information processing apparatus to the input commands, and the like.

Reference numeral 909 denotes a system bus which controls the flow of data in the information processing apparatus. Reference numeral 908 denotes an interface (to be abbreviated as I/F hereinafter). Data are exchanged with external devices via this I/F 908.

Note that software which implements functions equivalent to the aforementioned devices may implement the apparatus as alternatives to hardware devices.

This embodiment will exemplify a case in which programs and related data according to this embodiment are directly loaded from the medium 904 onto the RAM 902 when they are executed. In addition, upon operating programs according to this embodiment, they may be loaded from the HD 905 in which the programs are already installed onto the RAM 902. Also, programs according to this embodiment may be recorded in the ROM 901 to form a part of a memory map, and may be directly executed by the CPU 900.

This embodiment will explain an arrangement in which the information processing apparatus according to this embodiment is implemented by a single apparatus for the sake of simplicity. Alternatively, the information processing apparatus may be implemented by an arrangement in which resources are distributed to a plurality of apparatuses. For example, resources of storage and arithmetic operations may be distributed to a plurality of apparatuses. Or, resources may be distributed to building components which are virtually implemented on the information processing apparatus so as to execute parallel processing.

(Functional Arrangement of Information Processing Apparatus)

Figure 1:
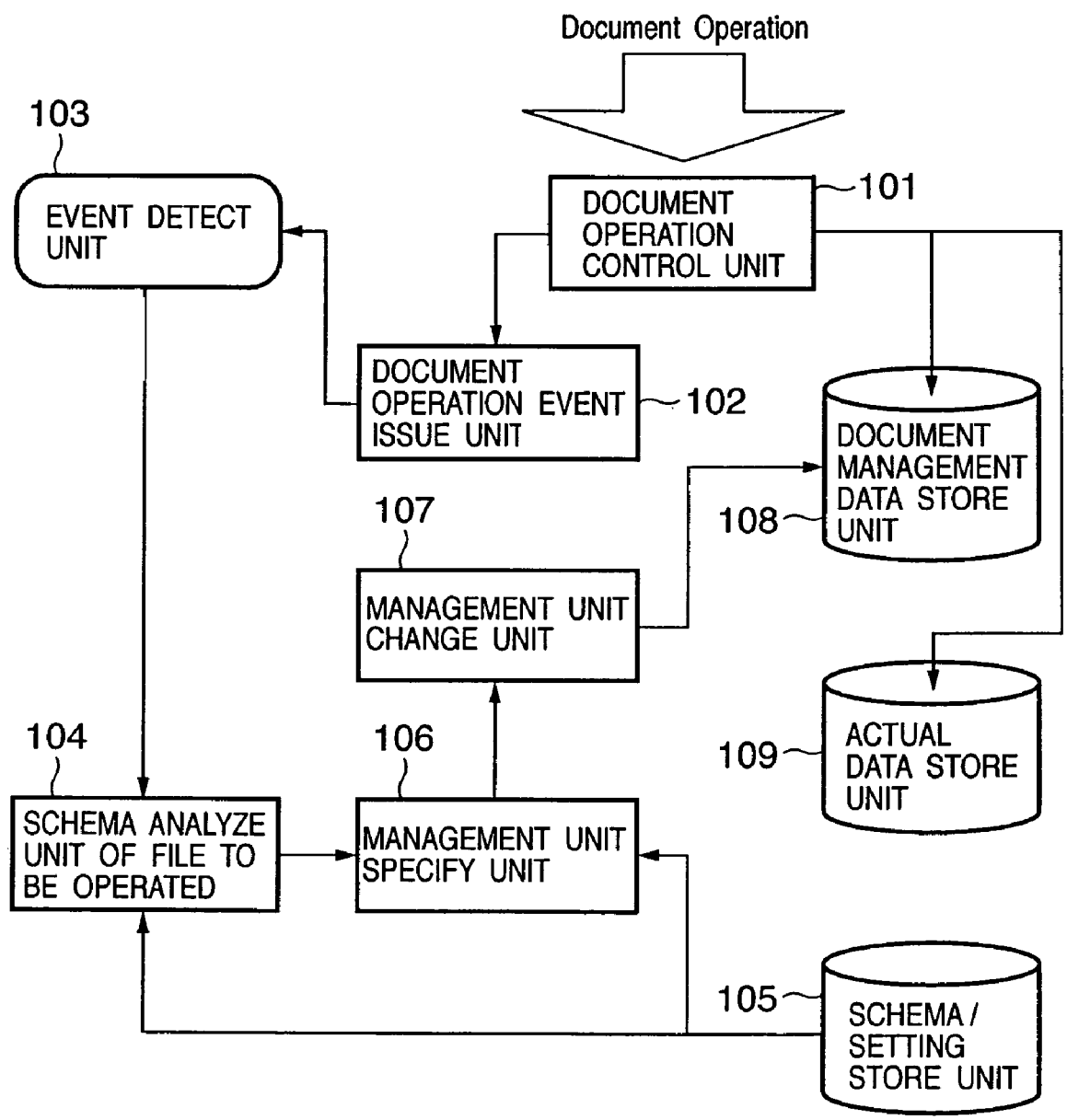
FIG. 1 is a block diagram showing the functional arrangement of an information processing apparatus according to an embodiment of the present invention.

The functional arrangement for document management by the aforementioned information processing apparatus will be described below with reference to FIG. 1. FIG. 1 is a block diagram showing the functional arrangement of the information processing apparatus according to this embodiment.

Functional blocks shown in FIG. 1 are implemented when the CPU 900 of the information processing apparatus which has been described with reference to FIG. 9 executes programs loaded onto the RAM 902 in cooperation with the hardware components shown in FIG. 9. Of course, some or all of the functional blocks may be implemented by dedicated hardware components.

Referring to FIG. 1, reference numeral 101 denotes a document operation control unit which controls document operations on the document management system. The document operation control unit 101 receives operation instructions by the user via the instruction input device 906, and operation instructions from external apparatuses via a network. An input instruction includes identification information that identifies a document file, and content information that describes the instruction contents about this document file. Upon reception of an operation instruction of document data, the document operation control unit 101 notifies a document operation event issue unit 102 (to be described later) of information indicating reception of the instruction. Also, the document operation control unit 101 executes predetermined processing based on the instructed operation with respect to a document management data save unit 108 (to be described later) that stores document management data (management data about documents) and an actual data save unit 109 (to be described later) that stores file data of documents.

Reference numeral 102 denotes a document operation event issue unit, which issues an event upon reception of information indicating reception of the instruction from the document operation control unit 101. Reference numeral 103 denotes a document operation event detect unit which detects an event issued by the document operation event issue unit 102, and calls appropriate processing.

Reference numeral 104 denotes a schema analyze unit which specifies a file to be operated, and makes schema matching of the specified file by comparing that file with schemas registered in a schema/setting save unit 105 (to be described later). That is, the schema analyze unit 104 determines whether or not the file to be operated is compliant to a format specified by any of the registered schemas (any of schemas matches). Note that each schema is data that describes a structure (format) that a document can adapt. For example, as languages that describe schemas of XML documents, XML schema, DTD (Document Type Definition), RELAX (REgular LAnguage description for XML), XML Data Reduced, and the like are available.

Figure 10:
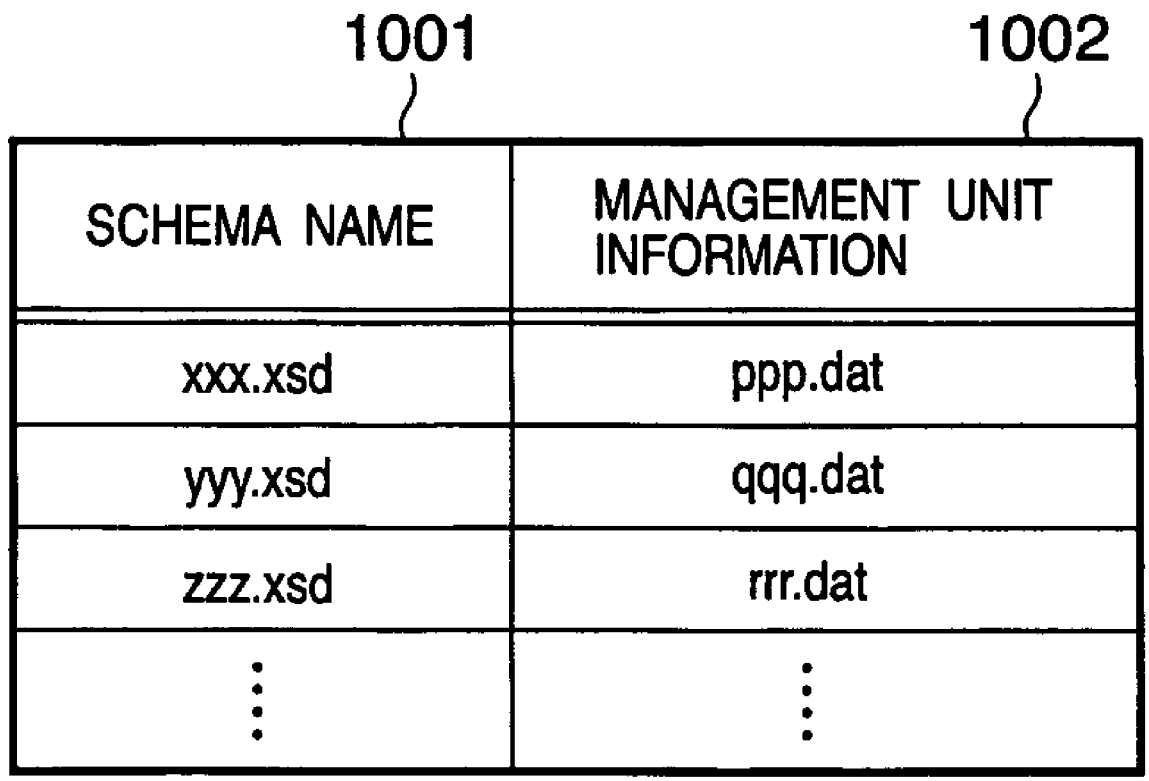
FIG. 10 shows the structure of data in a schema save unit.

Reference numeral 105 denotes a schema/setting save unit (to be referred to as a schema save unit hereinafter), which sets and saves (defines) schemas corresponding to the formats of files to be stored, and management information associated with management units corresponding to these schemas. FIG. 10 shows the structure of data in the schema save unit 105. Referring to FIG. 10, reference numeral 1001 denotes a schema file that describes each registered schema; and 1002, a management unit information file that describes management unit information corresponding to the schema file. As shown in FIG. 10, a schema file and management information file have one-to-one correspondence, and control is made to manage a document compliant to the description of the schema file based on the contents of the corresponding management unit information file. Note that the schema files and management unit information files are created and set in advance based on instructions from, e.g., the user or external apparatus.

Reference numeral 106 denotes a management unit specify unit which specifies a management unit corresponding to the file to be operated by loading management unit information that matches in the schema analyze unit 104 from the schema save unit 105.

Reference numeral 107 denotes a management unit change unit which appropriately adds and changes document management data saved in a document management data save unit 108 (to be described later). Note that the document management data includes information that describes correspondence between document files and document management units. A practical example of the document management data will be described later.

Figure 11:
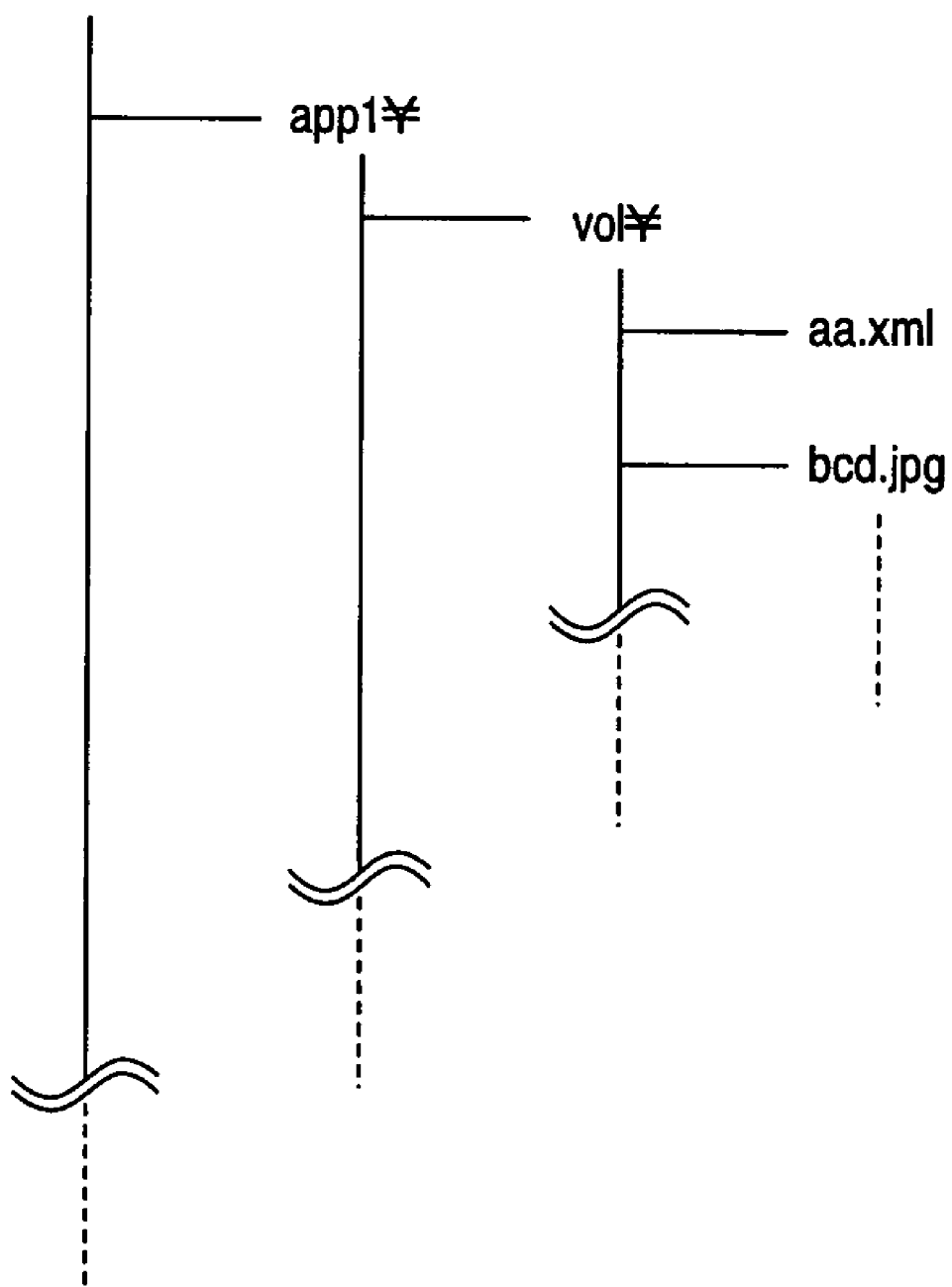
FIG. 11 shows the data structure in an actual data save unit.

Reference numeral 108 denotes a document management data save unit which saves document management data in designated management units. Reference numeral 109 denotes an actual data save unit which saves actual data of documents in file units independently of the document management data. FIG. 11 illustrates the data structure in the actual data save unit 109. As shown in FIG. 11, the actual data save unit 109 saves files which form document data as in a normal file system.

In this embodiment, the document operation control unit 101, document operation event issue unit 102, event detect unit 103, schema analyze unit 104, management unit specify unit 106, and management unit change unit 107 are virtually implemented as objects in the hardware arrangement shown in FIG. 9, i.e., by the CPU 900 which operates based on application programs, data mapped on the RAM 902, and the like. The schema save unit 105, document management data save unit 108, and actual data save unit 109 are implemented by storage devices such as the RAM 902, HD 905, and the like.

(Document Management Processing)

Figure 2:
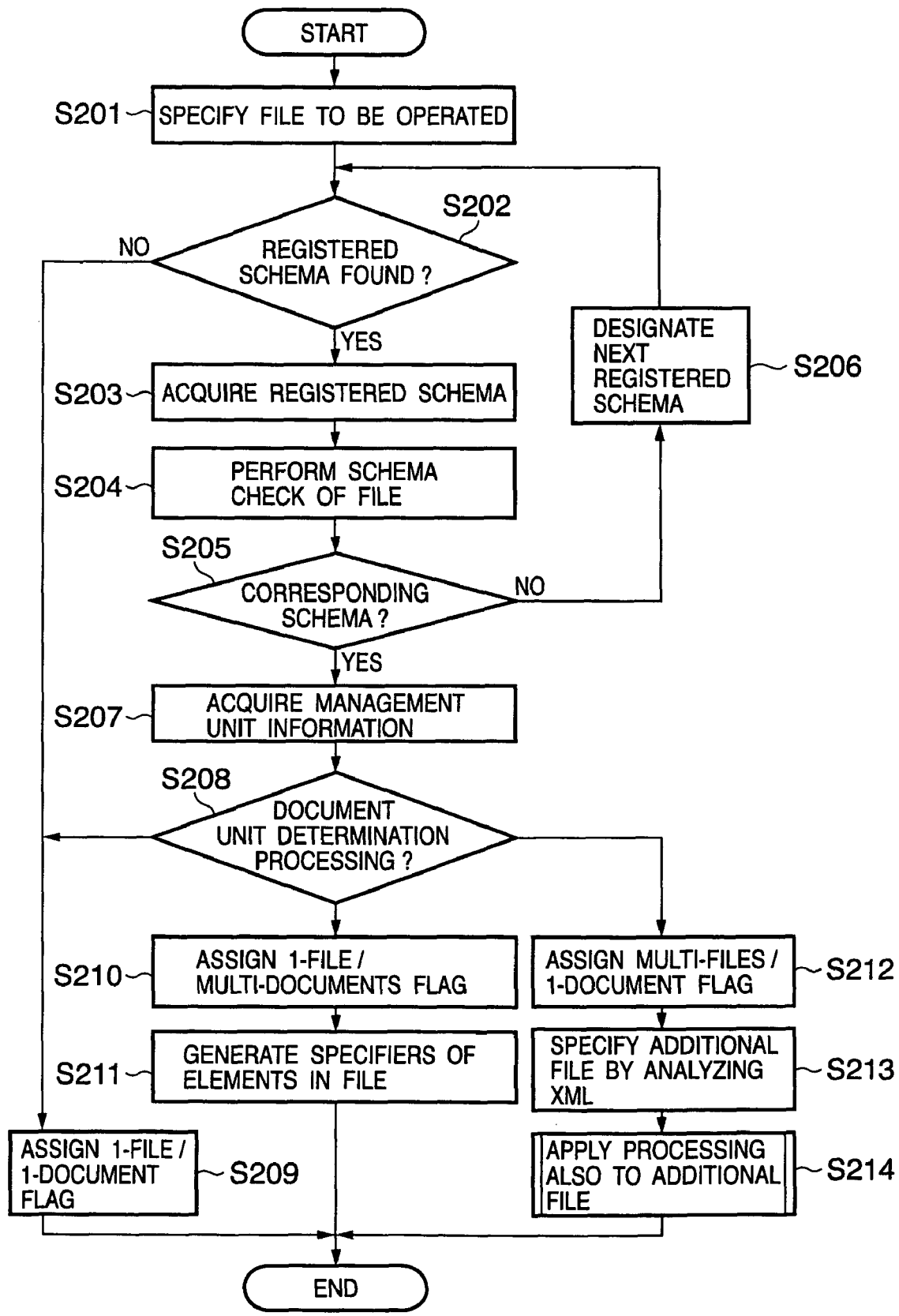
FIG. 2 is a flowchart showing the processing flow of document management processing.

The document management processing to be executed by the information processing apparatus according to this embodiment will be described below with reference to FIG. 2. FIG. 2 is a flowchart showing the processing flow of the document management processing. Note that the processing shown in FIG. 2 is implemented by, e.g., inter-object communications of the schema analyze unit 104, schema save unit 105, management unit specify unit 106, management unit change unit 107, and the like shown in FIG. 1 under the control of the CPU 900 of the information processing apparatus according to this embodiment.

The processing shown in FIG. 2 is executed in the wake of an event, which is issued by the document operation event issue unit 102 and is detected by the document operation event detect unit 103. Note that the document operation event issue unit 102 issues an event when the document operation control unit 101 receives an operation instruction by the user via the instruction input device 906 or an operation instruction from an external apparatus via the network. In this embodiment, processing to be executed upon reception of a registration instruction of a new document file will be exemplified. However, as will be described later, the processing is executed based on the flowchart of FIG. 2 even when other processing instructions such as a document delete instruction, attribute information change instruction, and the like are input.

In step S201, the contents of an input instruction are confirmed to specify a file to be operated. That is, the received identification information and content information are analyzed to specify a file to be operated based on the identification information used to identify a document file, and to confirm the instruction contents based on the content information that describe the instruction contents about the document file.

In processing in steps S202 to S206, processing for searching the schema save unit 105 for a schema corresponding to the file to be operated, i.e., a schema that defines the format of the file to be operated is executed.

It is checked in step S202 if a schema (a schema file which describes it), which is not referred to after the processing of step S201, remains saved in the schema save unit 105. If such schema remains saved (YES in step S202), the flow advances to step S203; otherwise (NO in step S202), the flow jumps to step S209.

In step S203, a schema file (schema data) which is saved and is not referred to is loaded.

It is checked in step S204 if the file to be operated is compliant to (matches) the loaded schema, i.e., it corresponds to the contents of the loaded schema file (schema check). If the file to be operated is compliant to the schema file (YES in step S205), the flow advances to step S207; otherwise, the flow advances to step S206.

In step S206, a flag is set in a storage device (memory) such as the RAM 902 or the like so as to refer to the next schema file which is registered in the schema save unit 105 and is not referred to. The flow returns to step S202 to perform schema check with reference to the schema file which is not referred to.

If the file to be operated is not compliant to all schema files after they are referred to (NO in step S202), the flow jumps to step S209 to assign a flag which handles the document to be operated as one file/one document, thus ending the processing.

In step S207, management unit information corresponding to the compliant schema is acquired from the schema save unit 105. This processing is executed by the management unit specify unit 106 when the processing shown in FIG. 2 is implemented by the building components shown in FIG. 1.

For the sake of simplicity, in this embodiment, the management unit information indicates one of the following three types:

A. 1-file/1-document;
B. 1-file/multi-documents; and
C. multi-files/1-document.

In case of A, in step S209 a flag is set on the memory to handle the document to be operated as normal 1-file/1-document, thus ending the processing.

In case of B, the flow advances to step S210 to set a 1-file/multi-documents flag on the memory. Then, a specifier used to specify entities to be handled as documents in the file is created in step S211. This specifier is described using, e.g., an XPath expression or the like that specifies elements in an XML file.

In case of C, the flow advances to step S212 to set a flag indicating that the file to be operated is handled as multi-files/1-document on the memory. After that, the file to be operated is parsed in step S213 to specify sub-files. After the sub-files are specified, the processing in FIG. 2 is recursively executed for these sub-files in step S214, thus deciding management units of the sub-files.

After the above processing is executed, the management unit change unit 107 in FIG. 1 executes processing for changing an actual management unit to rewrite document management data in the document management data save unit 108.

Figure 3:
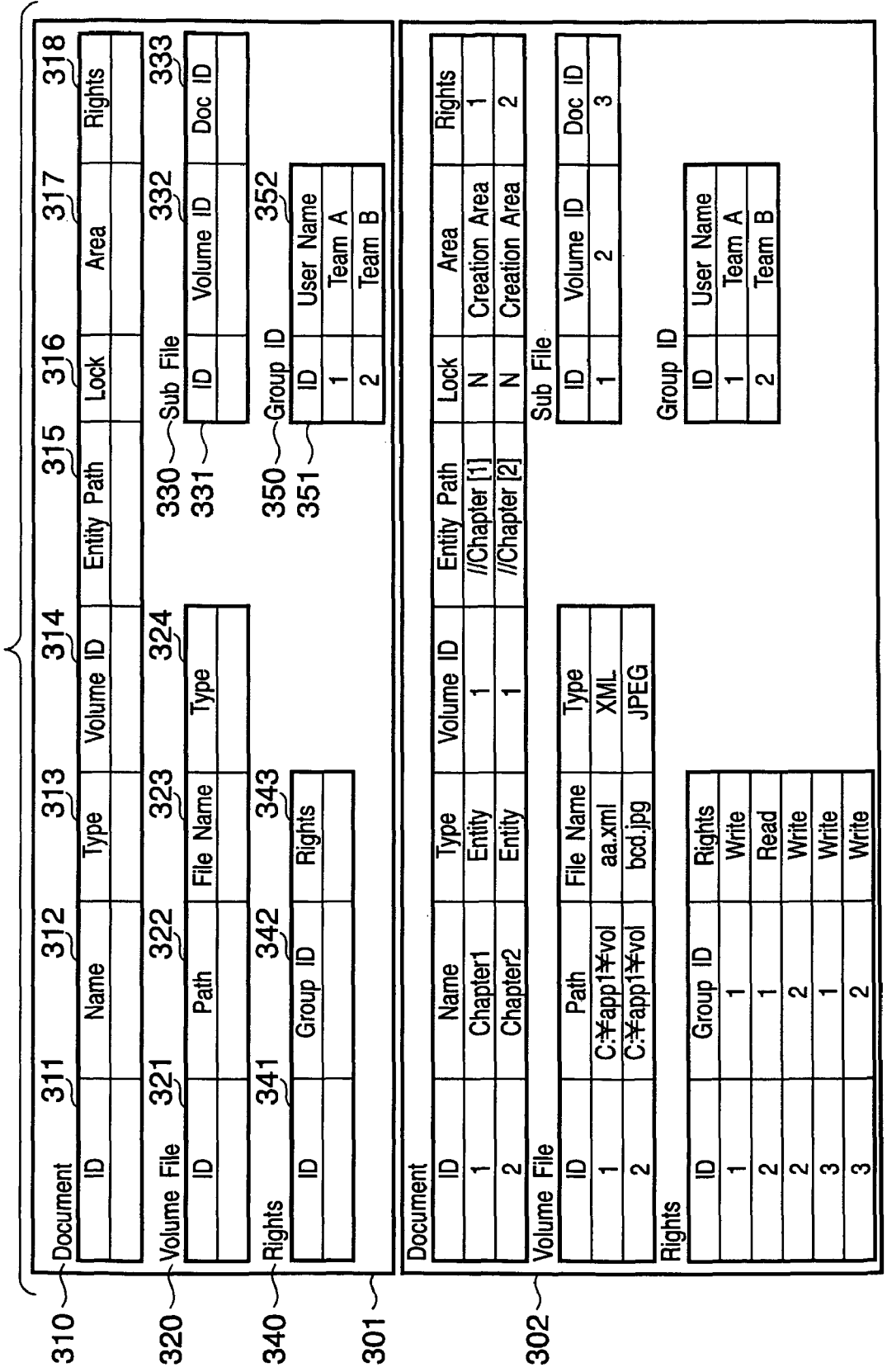
FIG. 3 shows an example of document management data.

FIG. 3 shows an example of document management data (table data) of the document management data save unit 108. Document management data 301 exemplifies data in a state in which only IDs Team_A and Team_B of groups that use this system are registered. Document management data 302 exemplifies data after two files exemplified in FIG. 4, i.e., aa.xml 401 and bcd.jpg 402 are stored.

As shown in FIG. 3, in this embodiment, document management data includes a document table 310, volume file table 320, sub-file table 330, rights table 340, and group table 350.

The document table 310 holds elements such as an ID 311 as an identifier of a document, a name 312 indicating a document name, a type 313 indicating the type of document management unit, a volume ID 314 as an identifier of a file that stores the document, a specifier (entity path) 315 used to specify documents as management units in a 1-file/multi-documents file, lock information 316, an area 317 indicating the location where a document is to be processed, rights information 318 as an identifier of rights information, and the like. Upon displaying a list of documents or the like, documents are displayed as independent documents for respective IDs of this document table.

The volume file table 320 holds elements such as an ID 321 as an identifier of an actual file, a path 322 indicating directory information that stores an actual file, an actual file name 323, a type 324 indicating the type of actual file, and the like.

The sub-file table 330 holds an ID 331 as an identifier of a sub-file, a volume ID 332 as an identifier of a corresponding volume (file), a document ID 333 as an identifier of a parent document, and the like.

The rights table 340 holds elements such as an ID 341 as an identifier of rights, a group ID 342 as an identifier of a group that makes access, rights 343 that describe the contents of permitted access, and the like.

The group table 350 holds elements such as an ID 351 as an identifier of a group, a user name 352 as a name of a user (group), and the like.

In the above tables, the volume ID 314 and ID 321, the rights information 318 and ID 341, the group ID 342 and ID 351, the volume ID 332 and ID 321, and the document ID 333 and ID 311 respectively correspond to each other. Note that the above configuration of the document management data is merely an example, and the document management data may have any other configurations depending on the use applications and purposes.

Figure 4:
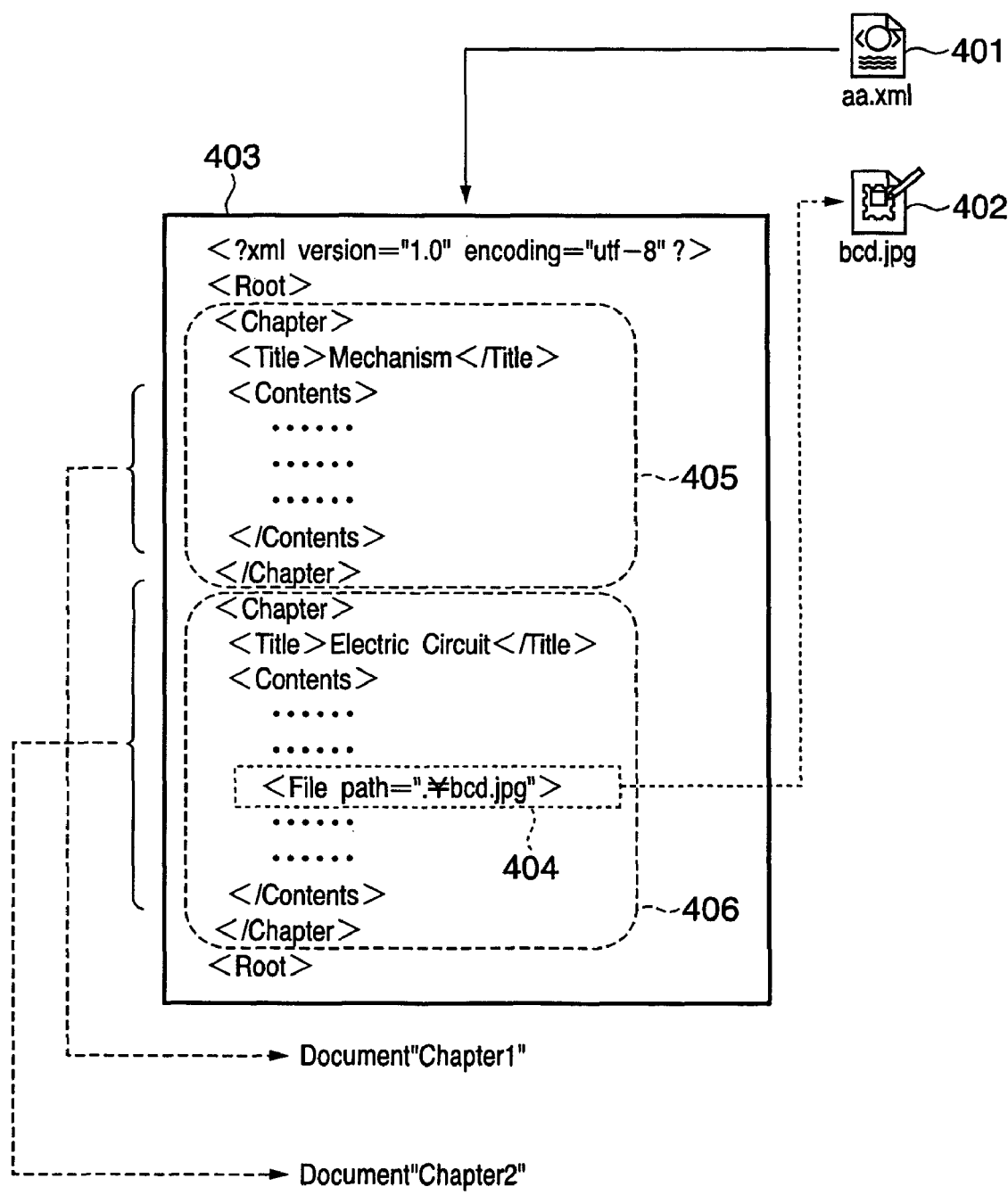
FIG. 4 shows an example of a document file.
Figure 5:
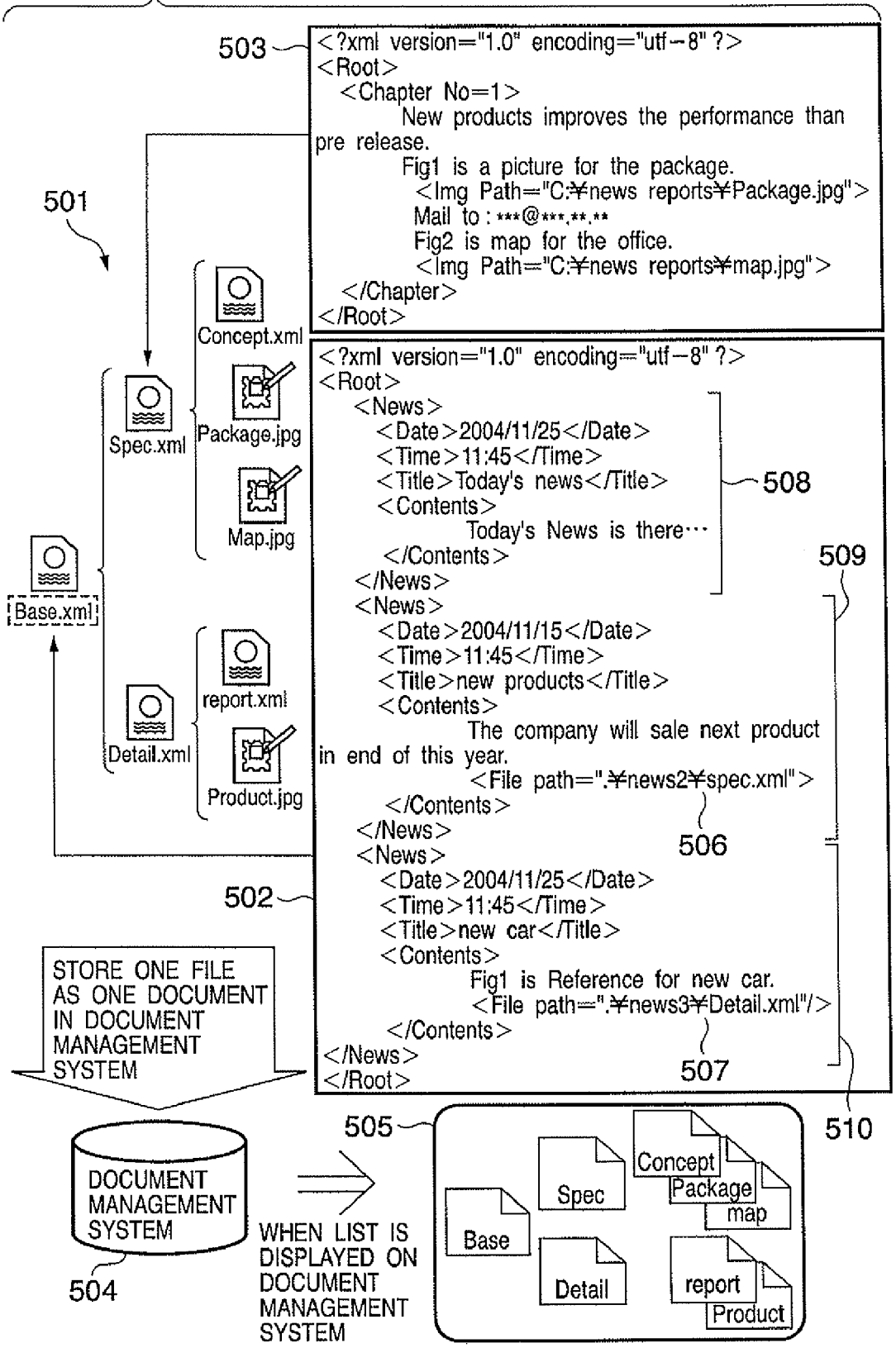
FIG. 5 shows an example of a document having a combined structure.

FIG. 4 shows an example of the document file. Referring to FIG. 4, reference numeral 403 denotes file contents of aa.xml 401. In the example of FIG. 4, aa.xml 401 has two Chapter elements 405 and 406, and the second Chapter element (Chapter2) 406 includes a description that instructs to fetch bcd.jpg, as indicated by 404. Therefore, aa.xml 401 corresponds to the 1-file/multi-documents format, since it has two document units, i.e., two Chapter elements. On the other hand, Chapter2 (406) corresponds to the multi-files/1-document format since it fetches bcd.jpg 402.

A schema for this document is saved in advance in the schema save unit 105. Also, information about a management unit indicating that Chapter elements are to be handled as documents upon storing the document corresponding to that schema in the system is described in management unit information corresponding to the schema. The information processing apparatus according to this embodiment registers respective management units of documents included in a single document file in the document table 310 as independent documents based on this management unit information.

When such aa.xml and bcd.jpg are stored in the system, control is made to add actual data information to the volume file table 320 together with the saving location paths of aa.xml and bcd.jpg as actual files.

Two documents are added to the document table 310 in Chapter units. In the above example, since the first Chapter element (Chapter1) 405 and second Chapter element (Chapter2) 406 have the IDs 321 of the same volume, the values of the volume ID 314 are set to point to the identical line of the volume file table 320, i.e., to indicate an identical actual file. Also, to the specifier (entity path) 315, a description that designates an element pointed by each document in the file is added in the format of XPath or the like. As for bcd.jpg, the identifier (document ID 333) of the parent document, i.e., "2" which is the same as the second value of the ID 311, is set and managed in the sub-file table 330 as an attached document of Chapter2.

On the other hand, in the rights table 340; rights information with the ID 341="1" defines that a group with the group ID="1", i.e., Team_A is permitted to make write access. Likewise, rights information with the ID 341="2" defines that a group with the group ID="1", i.e., Team_A is permitted to make read access, and a group with the group ID="2", i.e., Team_B is permitted to make write access. Furthermore, rights information 318 with the ID 341="1" is set for a document with the ID 311="1", i.e., Chapter1, and rights information 318 with the ID 341="2" is set for a document with the ID 311="2", i.e., Chapter2.

Therefore, members of Team_A have write right to Chapter1, but those of Team_B do not have any access right to Chapter1. The members of Team_A have only read right to Chapter2, but those of Team_B have write right to Chapter2.

In this way, the conventional system which stores one file as one document must manage Chapter1 and Chapter2 as one document together. However, the arrangement of this embodiment can separately manage Chapter1 and Chapter2. That is, access rights can be controlled to have documents as units in place of a file unit.

Note that the information processing apparatus according to this embodiment sets the document table 310, volume file table 320, and sub-file table 330 by analyzing the file to be operated based on the corresponding schema file, management unit information file, and the like upon storing document data. However, the values of the rights information 318 are designated as needed upon operation of documents. The rights table 340 may be set to cover all patterns of access right assignment in advance, or may be set in response to a given operation to a document. The group table 350 is set in advance.

A description about operations for documents having a 1-file/multi-documents format has been given. Also, operations for documents having a multi-files/1-document format are similarly managed using the respective tables of the document management data shown in FIG. 3. That is, the sub-file table 330 describes the dependency of files. Upon making an operation such as copy, delete, move, or the like, or an access right setting operation or the like with respect to the main body file, the information processing apparatus according to this embodiment controls to apply such operation to sub-files based on this dependency. In this way, documents having the multi-files/1-document format can be managed using the same document management data.

Second Embodiment

In the first embodiment, a case was explained wherein the management unit of a document is decided in the wake of storage of the document in the system. However, the document management unit may be changed in the wake of occurrence of a predetermined event, a change in status of a document, movement between logical management areas (document creation areas) where a document is located, and so forth after the document is stored in the system. In this embodiment, an arrangement which can change the management unit of a document in the wake of movement of the document from a document creation area to a document publish area will be exemplified below. Note that the document creation area is used to temporarily store a document so as to share the document created by a team including a plurality of users. The document publish area is used to publish and share the created document.

Figure 6:
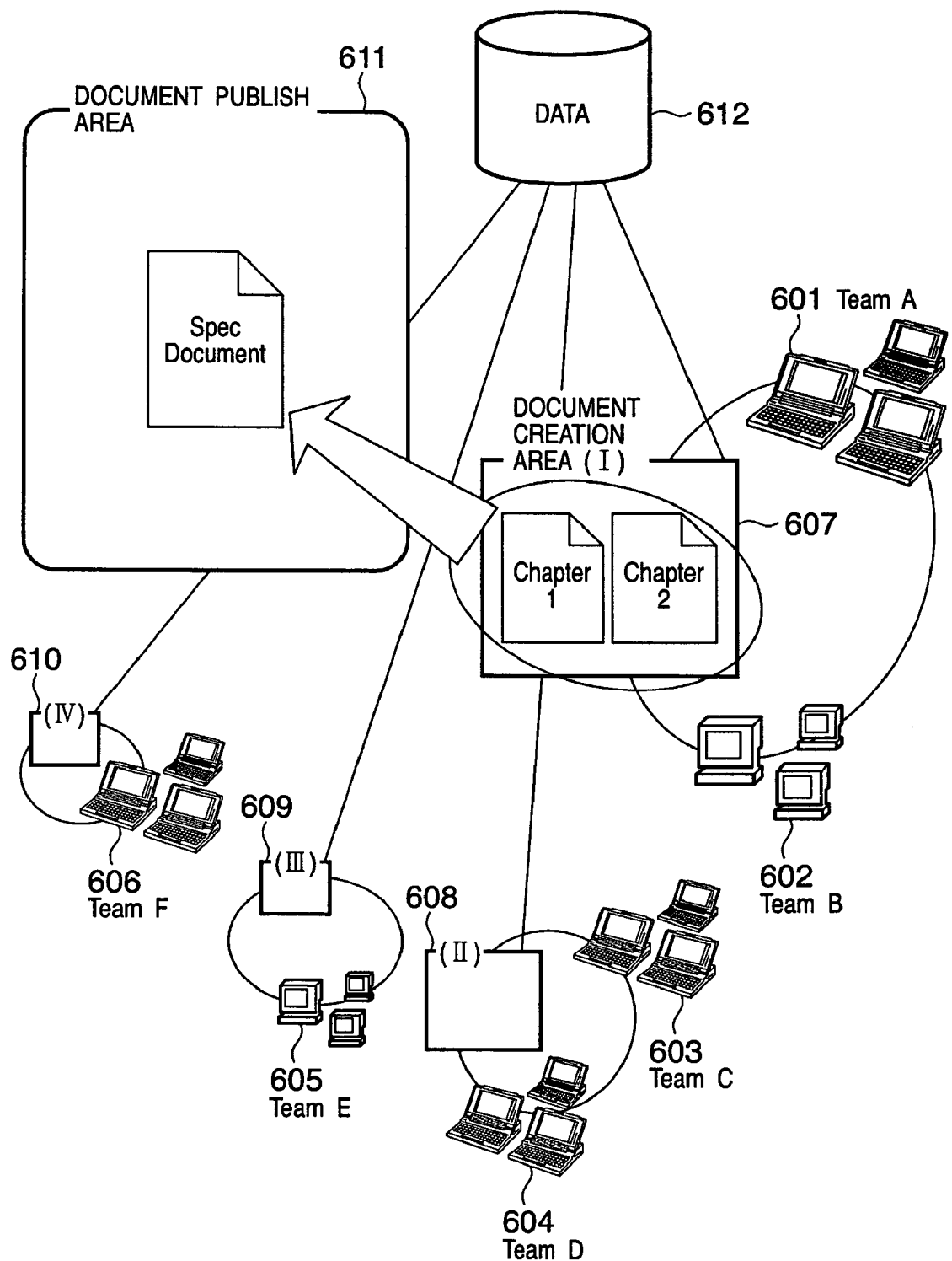
FIG. 6 is a view illustrating an example of a document management system that shares a document by a group of people.

For example, a document management system shown in FIG. 6 is assumed. FIG. 6 illustrates an example of the document management system which allows groups (teams) to share a document.

Reference numerals 601 to 606 respectively denote client groups Team A, Team B, . . . , Team F that use the system. Reference numerals 607 to 610 respectively denote document creation areas. Assume that the limited client group or groups indicated by a circle can access the document creation area that crosses the circle. Team A 601 and Team B 602 can access the document creation area (I) 607; Team C 603 and Team D 604, the document creation area (II) 608; Team E 605, the document creation area (III) 609; and Team F 606, the document creation area (IV) 610. Note that access includes sharing, creation, updating, display, list display, and the like of a document. As described above, individual access right control can be made on this document creation area to allow users who belong to each group to make access.

Reference numeral 611 denotes a document publish area, which is used to publish the created document as a product to all client groups, group users, or more group users. In this embodiment, assume that this area can be accessed by users who belong to all the client groups.

The document creation areas 607 to 610 and the document publish area 611 are logically partitioned areas, and may physically exist on the same system or database. Hence, in this embodiment, assume that all of the document creation areas 607 to 610 and the document publish area 611 are assured in an identical database 612. Of course, the document creation areas 607 to 610 and the document publish area 611 may be assured in independent devices.

Figure 7:
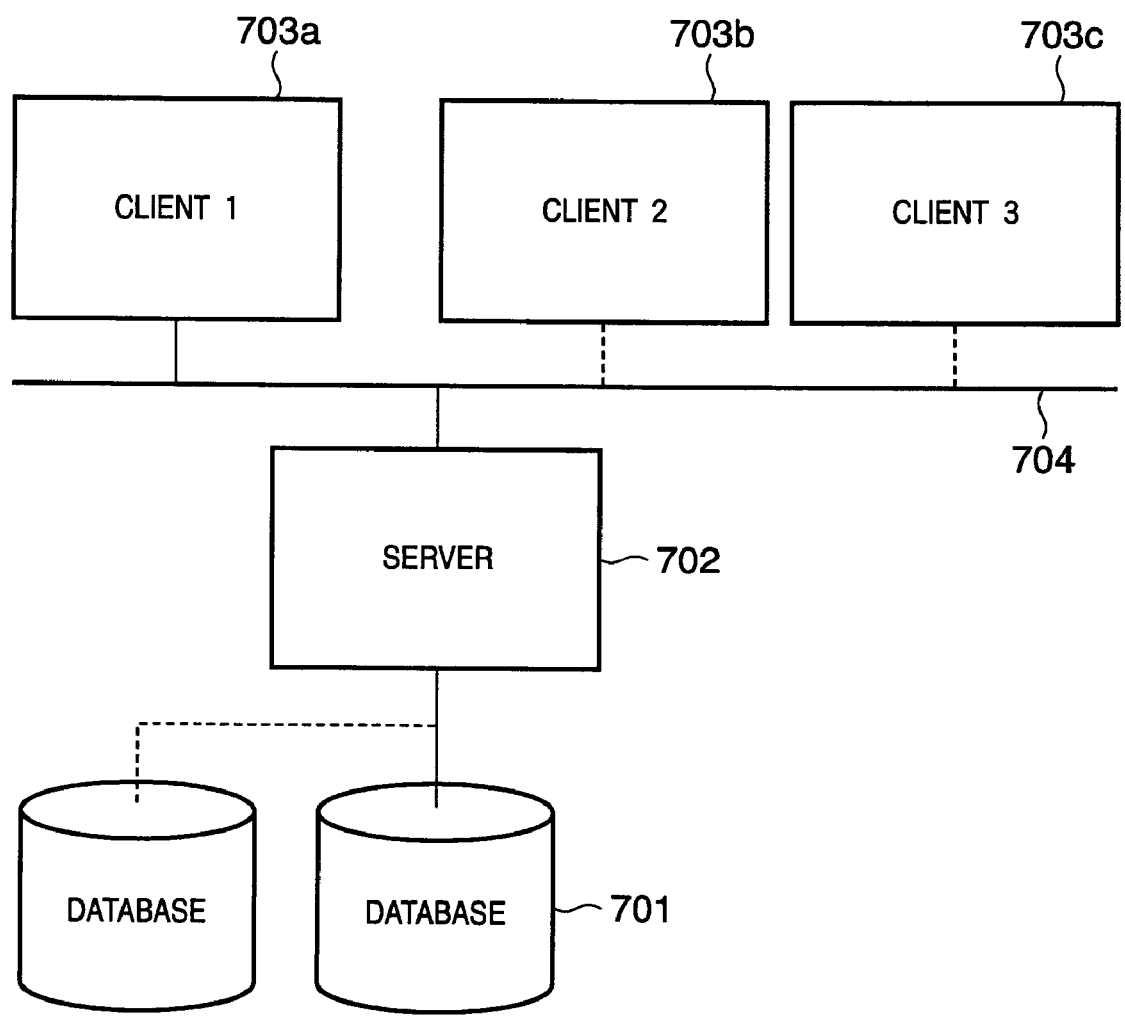
FIG. 7 is a block diagram showing an example of the physical arrangement of the document management system that shares a document by a group of people.

FIG. 7 is a block diagram showing an example of the physical arrangement of the document management system exemplified in FIG. 6. Referring to FIG. 7, reference numeral 701 denotes databases which serve as the document management data save unit 108, actual data save unit 109, and schema save unit 105. Reference numeral 702 denotes a server connected to the databases and a network 704 (to be described later). Reference numerals 703a to 703c (to be generally referred to as 703 hereinafter) denote clients which are operated by users to access the server 702. Reference numeral 704 denotes a network which connects the server 702 and clients 703.

The server 702 and clients 703 are respectively implemented by, e.g., a personal computer (PC), workstation (WS), personal digital assistant (PDA), and the like. The network 704 typically comprises a LAN, but it can comprise any other configurations as long as it is a line that allows data communications such as a public line (analog line, ISDN, or the like), WAN, wireless LAN, or the like independently of wired/wireless networks. A communication protocol that uses the network can adopt, e.g., TCP/IP or the like.

In the arrangement of FIG. 7, the server 702, databases 701, and clients 703 form respective elements shown in FIG. 1 jointly. That is, a client-server system via the network 704 is assumed, and the server 702 connected to one or more databases 701 accepts access from one or more clients 703. Assume that the document creation areas 607 to 610, document publish area 611, and data in FIG. 6 physically exist on each database 701 in FIG. 7.

In such system, a case will be examined below wherein two documents, i.e., Chapter1 and Chapter2, exist on the document creation area 607, and processing "publish" is to be made to the document publish area 611.

The data configuration of Chapter1 and Chapter2 is the same as 302 in FIG. 3 described in the first embodiment, and is denoted by 801 in FIG. 8. FIG. 8 shows an example of document management data in this document management system. A situation will be examined below wherein Chapter1 and Chapter2 have been respectively edited and updated by Team_A and Team_B, and since a document is completed, Chapter1 and Chapter2 are combined into a document as chapters as in the data structure of an original file and the combined document is published to the document publish area. Assume that management unit information corresponding to a schema file of documents to be operated describes that documents are to be handled as the (1-file/multi-documents) format having Chapter elements as units on the document creation area 607, and that the documents are to be handled as the (multi-files/1-document) format on the document publish area.

In this case, when a process "publish" is done, a publish operation event is issued to the document operation control unit 101, and the information processing apparatus according to this embodiment starts the processing flow in FIG. 2 in response to this event.

In that processing, the information processing apparatus according to this embodiment starts transactions of the database 701 and controls to add a new line 803 for a document which is instructed to be created on the document publish area, and to change the document ID 333 (parent document ID) of the attached file bcd.jpg stored in the sub-file table 330 to an ID (3) of the document to be published. Furthermore, the information processing apparatus controls to delete lines 804 and 805 corresponding to the documents (Chapter1 and Chapter2) as sources of the document to be published from the document table 310. After such processing, the information processing apparatus commits transactions.

Note that the sub-file table 330 may be changed by, e.g., adding another line. Likewise, the lines 804 and 805 corresponding to Chapter1 and Chapter2 may be left stored in the document table 310.

As described above, according to the arrangement of this embodiment, the management unit of documents can be changed in the wake of changes in status of documents and logical area where the documents are located for the documents which are stored once in the system and whose management unit is decided. In this manner, the user can easily manage documents.

In the above arrangement, when the multi-documents format is converted into the 1-document format by changing the management unit of documents, document management data such as attributes, index information, and the like of respective documents before conversion may be combined and integrated. The document management data can be combined and integrated, e.g., as follows. That is, a plurality of document management data are classified into information with identical values and information with non-identical values. The information with identical values is applied intact to the document after conversion, and appropriate information is selected for the information with non-identical values based on a policy set in advance and is applied to the document after conversion. When a file including link information of files is converted to be referred to from other new files, the document management data are hierarchized to reflect the reference relationship among files. The converted document data are listed parallelly. With the above processing, the user can easily integrate a plurality of documents.

In the above arrangement, when the multi-documents format is converted into the 1-document format by changing the management unit of documents, especially, control may be made to read out a access right list or an ID sequence indicating the access rights of a document group before conversion onto a memory, to combine these access rights based on the readout information, and to assign the combined access rights to the document after conversion. Note that the access rights may be combined, so that the lowest or highest ones of the rights assigned to the documents before conversion may be set depending on the use applications or purposes. For example, when the management unit of a document assigned with read right and that of a document assigned with write right are to be combined, read or write right may be assigned to the combined document. With this processing, the user who can make access before conversion is permitted to access the converted document.

In the above arrangement, the schema save unit 105 may also hold user (or group) identification information in association with each other in addition to the schema files and management unit information. Furthermore, when the user makes an instruction input to a document file, the operation user may be specified, management unit information may be acquired in association with the identification information of that ser, and document management data may be created or updated based on this management unit information. In this manner, the management unit of documents corresponding to an identical schema can be changed in accordance with the user (or group) who uses the system.

In the above arrangement, when the 1-document format is converted into the multi-documents format by changing the management unit of documents, a UI that prompts the user to set the logical storage location, access rights, and the like may be displayed on the display 907, and the document management data may be created or updated based on the settings input by the user via the UI. In this way, the user can easily set access rights to the converted document.

Note that the start timing of the aforementioned processing can be based on occurrence of predetermined events depending on the use applications or purposes. For example, the processing can start in the wake of storage of a document in the system, a change in logical save location of the document, a change in attribute or status of the document, external output of the document file from the system, printing of the document, and so forth.

Other Embodiments

The preferred embodiments of the present invention have been explained, and the present invention can be practiced in the forms of a system, apparatus, method, program, storage medium, and the like. More specifically, the present invention can be applied to either a system constituted by a plurality of devices, or an apparatus consisting of a single equipment.

Note that the present invention includes a case wherein the invention is achieved by directly or remotely supplying a program that implements the functions of the aforementioned embodiments to a system or apparatus, and reading out and executing the supplied program code by a computer of that system or apparatus.

Therefore, the program code itself installed in a computer to implement the functional processing of the present invention using the computer is included in the technical scope of the present invention. That is, the present invention includes the computer program itself for implementing the functional processing of the present invention.

In this case, the form of program is not particularly limited, and an object code, a program to be executed by an interpreter, script data to be supplied to an OS, and the like may be used as along as they have the functions of the program.

As a recording medium for supplying the program, for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file including an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, the user who has cleared a predetermined condition may be allowed to download key information used to decrypt the encrypted program from a home page via the Internet, and the encrypted program may be executed using that key information to be installed on a computer, thus implementing the present invention. The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, the document management technique which can uniformly manage document data having various configurations can be provided.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-171658, filed on Jun. 10, 2005 which is hereby incorporated by reference herein in its entirety.

What is claimed is:

1. An information processing apparatus comprising:
a storage device that stores a plurality of schemas defining document formats, and stores management-unit-information, wherein the management-unit-information is set for each of the schemas in advance and indicates a management unit of a document file, wherein the management unit is any one of a plurality of predetermined file/document configurations including at least a 1-file/1-document configuration, a 1-file/multi-documents configuration, and a multi-files/1-document configuration, and wherein the 1-file/1-document configuration indicates that one single document is configured with one single file, the 1-file/multi-documents configuration indicates that multiple documents are configured with one single file, and the multi-files/1-document configuration indicates that one single document is configured with multiple files;
a receiving unit configured to receive an instruction indicating an operation to a document file;
an analysis unit configured to analyze the instruction received by the receiving unit to determine a document file to be operated, and to determine a schema that conforms to said determined document file from the plurality of schemas stored in the storage device;
a specifying unit configured to specify a management unit of the determined document file as one of the plurality of predetermined file/document configurations by acquiring from the storage device the management-unit-information that is set in advance for the schema that is determined to conform to the determined document file;
a create/update unit configured to create or update document management data for processing the document file as the management unit specified by the specifying unit, wherein updating the document management data effects change of the management unit by which the document file is processed;
a hold unit configured to hold the document management data; and
a control unit configured to control, during processing of the document file, the management unit of the document file as one of the plurality of predetermined file/document configurations based on the document management data held in the hold unit
wherein the instruction indicating an operation to the document file indicates an operation to move the document file among a plurality of management areas including a management area to which predetermined users can access and a management area to which all users can access;
wherein the management-unit-information indicates the management unit of the document file for each of the management areas; and
wherein the specifying unit specifies the management unit of the determined document file based on the instruction, and the management-unit-information acquired from the storage device for the schema that is determined to conform by the analysis unit.

2. The apparatus according to claim 1, wherein in the case where the analysis unit determines that the schema corresponding to the determined document file is not stored in the storage device, the specifying unit specifies the management unit of the document file as the 1-file/1-document configuration.

3. The apparatus according to claim 1, wherein the document management data includes right information indicating access right for each management unit of the document file.

4. A method of controlling an information processing apparatus, comprising:
- a receiving step of receiving an instruction indicating an operation to a document file;
- an analysis step of analyzing the instruction received at the receiving step to determine a document file to be operated, and to determine a schema that conforms to said determined document file from a plurality of schemas stored in a storage device, wherein said storage device stores the plurality of schemas defining document formats, and stores management-unit-information, wherein the management-unit-information is set for each of the schemas in advance and indicates a management unit of a document file, wherein the management unit is any one of a plurality of predetermined file/document configurations including at least a 1-file/1-document configuration, a 1-file/multi-documents configuration, and a multi-files/1-document configuration, and wherein the 1-file/1-document configuration indicates that one single document is configured with one single file, the 1-file/multi-documents configuration indicates that multiple documents are configured with one single file, and the multi-files/1-document format indicates that one single document is configured with multiple files;
- a specifying step of specifying a management unit of the determined document file as one of the plurality of predetermined configurations by acquiring from the storage device the management-unit-information that is set in advance for the schema that is determined to conform to the determined document file;
- a create/update step of creating or updating document management data for processing the document file as the management unit specified at the specifying step, wherein updating the document management data effects change of the management unit by which the document file is processed;
- a hold step of holding the document management data in a hold unit; and
- a control step of, during processing of the document file, controlling the management unit of the document file as one of the plurality of predetermined file/document configurations based on the document management data held in the hold unit
- wherein the instruction indicating an operation to the document file indicates an operation to move the document file among a plurality of management areas including a management area to which predetermined users can access and a management area to which all users can access;
- wherein the management-unit-information indicates the management unit of the document file for each of the management areas; and
- wherein the specifying step specifies the management unit of the determined document file based on the instruction, and the management-unit-information acquired from the storage device for the schema that is determined to conform by the analysis step.

5. A computer-readable storage medium storing a computer program for making a computer execute the following steps:
- a receiving step of receiving an instruction indicating an operation to a document file;
- an analysis step of analyzing the instruction received at the receiving step to determine a document file to be operated, and to determine a schema that conforms to said determined document file from a plurality of schemas stored in a storage device, wherein said storage device stores the plurality of schemas defining document formats, and stores management-unit-information, wherein the management-unit-information is set for each of the schemas in advance and indicates a management unit of a document file, wherein the management unit is any one of a plurality of predetermined file/document configurations including at least a 1-file/1-document configuration, a 1-file/multi-documents configuration, and a multi-files/1-document configuration, and wherein the 1-file/1-document configuration indicates that one single document is configured with one single file, the 1-file/multi-documents configuration indicates that multiple documents are configured with one single file, and the multi-files/1-document configuration indicates that one single document is configured with multiple files;
- a specifying step of specifying a management unit of the determined document file as one of the plurality of predetermined file/document configurations by acquiring from the storage device the management-unit-information that is set in advance for the schema that is determined to conform to the determined document file;
- a create/update step of creating or updating document management data for processing the document file as the management unit specified at the specifying step, wherein updating the document management data effects change of the management unit by which the document file is processed;
- a hold step of holding the document management data in a hold unit; and
- a control step of, during processing of the document file, controlling the management unit of the document file as one of the plurality of predetermined file/document configurations based on the document management data held in the hold unit
- wherein the instruction indicating an operation to the document file indicates an operation to move the document file among a plurality of management areas including a management area to which predetermined users can access and a management area to which all users can access;
- wherein the management-unit-information indicates the management unit of the document file for each of the management areas; and
- wherein the specifying step specifies the management unit of the determined document file based on the instruction, and the management-unit-information acquired from the storage device for the schema that is determined to conform by the analysis step.

* * * * *